Aug. 15, 1950     L. R. METZ     2,518,487

FISH LURE

Filed May 16, 1945

LEONARD R. METZ
INVENTOR.

BY
*H. A. McGrew*
ATTORNEY

Patented Aug. 15, 1950

2,518,487

UNITED STATES PATENT OFFICE 2,518,487

FISH LURE

Leonard R. Metz, Denver, Colo., assignor of one-half to Dewey H. Burrows, Lakewood, Colo.

Application May 16, 1945, Serial No. 594,027

2 Claims. (Cl. 43—42.48)

This invention relates to fish lures, and particularly to fish lures of the type which simulate a minnow or small fish. A fish lure constructed in accordance with this invention is particularly useful in catching pan fish, such as bass, crappies, and the like.

Among the objects of this invention are to provide a fish lure which will simulate a minnow or small fish, and which will remain upright during movement over or through the water; to provide a fish lure which may be made of different materials; to provide a fish lure to which a hook may be securely attached; and to provide an article of manufacture which may be used as an ornament, or as a fish lure.

Other objects and novel features will become apparent from the description which follows, taken in connection with the accompanying drawings, in which.

Figure 1:
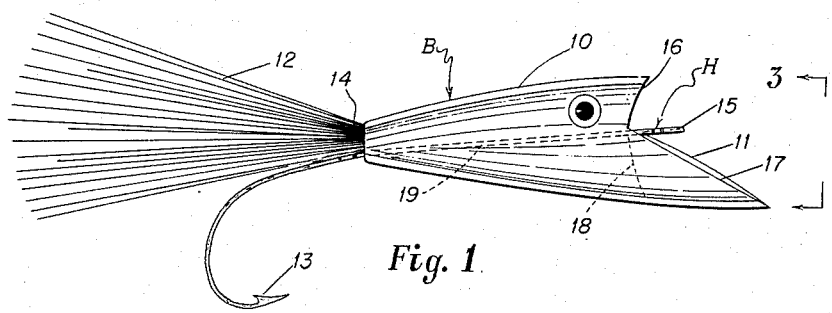
Fig. 1 is a side elevation of a fish lure constructed in accordance with this invention.
Figure 2:
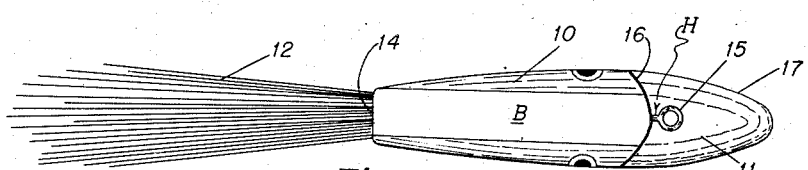
Fig. 2 is a top plan view of the fish lure of Fig. 1.
Figure 3:
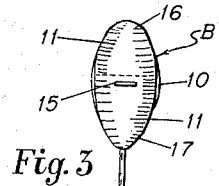
Fig. 3 is a front elevation of the fish lure of Fig. 1.

A fish lure constructed in accordance with this invention, as illustrated in Figs. 1 to 4, inclusive, may comprise a body B and a hook H extending therethrough. The body consists of a shell 10, which is generally elliptical in cross section, i. e., narrower in one direction than the other and rounded, having filler material 11, such as some hardenable material like plastic, plastic wood, or wood fibers, disposed therein, and a plurality of fibrous elements 12, such as for example feathers, animal hairs, which may extend from a point within the shell to a point rearwardly of a barb 13 of the hook.

The shell 10 may be formed from a portion of a turkey quill, cut away so that the smaller or rear end 14 provides a sufficiently large opening through which an eye 15 may pass for attachment of a fishing line. The eye 15 of the hook is preferably positioned at substantially the centerline of the shell, and the front of the shell is cut away to simulate the open mouth of a minnow, but with an exaggerated undershot lower jaw. Thus, the upper section 16 of the front end of the shell is inclined slightly forwardly with respect to an imaginary vertical line through the forward portion of the shell 10, but the lower section 17 is inclined forwardly at a greater angle to the said vertical line. Stated slightly differently, the lower front end of the shell and lure extends to a substantially greater distance forwardly than the upper front end, and preferably even forwardly of eye 15 of hook H.

The forwardly extending lower front section of the shell and body is an important feature of this invention. It has been found by test that if the lower front section of the shell is cut away similarly to the upper section, as along dotted line 18 of Fig. 1, the lure tends to turn over in the water and lie flat on its side, thus tending to simulate a dead minnow. By virtue of the lower, forwardly extending section 17, which gives an exaggerated undershot jaw effect to the lure as indicated previously, the center of gravity of the lure is transferred to a point below the centerline of the shell, so that eye 15 of the hook is always above the center of gravity. This maintains the lure in an upright position, even during complicated maneuvers. Also, the front surface of the undershot jaw has a tendency to "dig" into the water, thereby further assisting in maintaining the lure in an upright position.

The exterior of the shell may be decorated in any suitable manner, such as to provide colored striping and eyes thereon, as shown. The fibrous elements 12 are preferably animal fibres, such as polar bear hairs, beaver hairs, squirrel tail hairs, gamecock feathers, or the like, but artificial fibrous elements of plastic material, or the like, may be utilized, if desired.

The hook H and fibrous elements 12 are embedded in filler material 11, which preferably completely fills the interior of the shell and corresponds in extent to the outline of the shell. Such filler material is preferably hardenable, i. e., adapted to be placed in the shell in a pasty condition, or the like, and set or harden to form a relatively hard filling for the shell. Various types of plastics, such as soy bean plastic, granular cements, and the like, are suitable for the purpose. It will be understood, of course, that the filler material is preferably water resistant after setting, or is coated with water resistant material over exposed surfaces.

Figure 5:
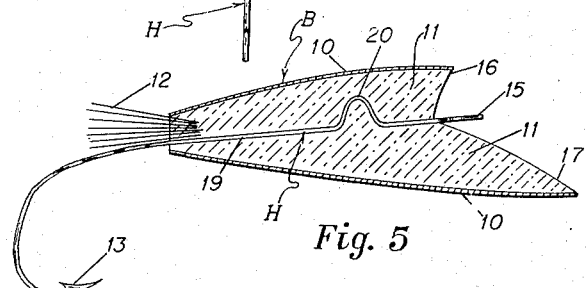
Fig. 5 is a longitudinal section of a lure having a slightly different type of hook.
Figure 4:
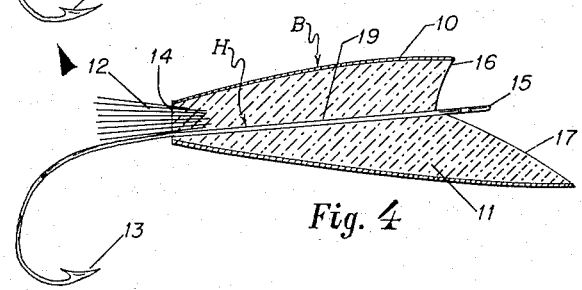
Fig. 4 is a longitudinal section of the fish lure of Fig. 1.

The filler material holds the hook and the fibrous elements securely within the shell, although in some instances, due to rough usage, there may be a slight tendency for the shank 19 of the hook to turn in the filler. In such instances, the construction illustrated in Fig. 5 may be utilized, wherein shank 19' of the hook is provided with a bend 20, which secures the hook against turning.

The barb 13 of the hook is preferably disposed below and slightly to the rear of the body, so that the lure may be maneuvered at or near the surface, with the result that when a fish strikes from beneath, the probability of the fish engaging the hook is greater. Also, if the fish strikes from the rear and below, the hook will tend to be seized by the fish, if any other part of the lure is touched. Thus, it is apparent that there is a definite cooperation between the position of the barb and the provision of an exaggerated undershot lower jaw of the lure, the latter insuring that the barb will be in the best position for catching the fish by maintaining the lure in an upright position.

Although the fish lure and ornament of this invention have been shown and described as including a body formed by a shell and filler material, it will be understood that the body may be formed in other ways. In addition, the shell 10 may be made of plastic, wood, or even light weight metal, to any of which the desired decorative effects may be applied, and the filler 11 may comprise materials different than those specified.

It will further be understood that additional changes may be made without departing from the spirit and scope of this invention, as defined in the appended claims.

What is claimed is:

1. An artificial fish lure comprising a rearwardly tapering shell generally elliptical in transverse cross section, the smaller end of said shell being to the rear and the front end of said shell being cut away to simulate the open mouth of a small fish having an exaggerated undershot lower jaw, the lower front portion of said shell being extended forwardly for a sufficient distance to locate the center of gravity of the shell at a point below the center line thereof, a hook disposed in part within said shell and provided with an attachment for a fishing line disposed at the forward end of the shell substantially at the center line thereof, the hook portion thereof extending outwardly and downwardly in a gradual curve from the rear end of the shell and terminating at a point considerably below and somewhat beyond the rear small end of the shell, said hook in its entirety extending in the plane of a vertical longitudinal line through the shell, a body of hardenable plastic-like material filling substantially the entire area of the shell and forming a portion of the undershot lower jaw, the shank portion of the hook extending in a rearwardly and downwardly inclined plane through and securely embedded in the body of hardenable plastic-like material, and a plurality of fibrous elements having their inner end portions embedded in the hardenable material in the vicinity of the rear end of the shell and extending outwardly from said rear end above the hook to spread out in substantially a fan-like arrangement.

2. An artificial fish lure according to claim 1, wherein the rearwardly tapering shell is formed from a portion of a quill.

LEONARD R. METZ.

REFERENCES CITED

The following references are of record in the file of this patent:

UNITED STATES PATENTS

| Number | Name | Date |
|---|---|---|
| 284,056 | Pflueger | Aug. 28, 1883 |
| 1,483,842 | Carter | Feb. 12, 1924 |
| 1,549,792 | O'Keefe | Apr. 18, 1925 |
| 1,583,199 | Taylor | May 4, 1926 |
| 1,782,818 | Grubman | Nov. 25, 1930 |
| 1,846,060 | Konoff | Feb. 23, 1932 |
| 2,119,417 | Brown | May 31, 1938 |
| 2,215,971 | Miles | Sept. 24, 1940 |
| 2,224,389 | Haselwood | Dec. 10, 1940 |
| 2,326,811 | Wiggam et al. | Aug. 17, 1943 |
| 2,333,484 | Miles | Nov. 2, 1943 |
| 2,341,823 | Smith | Feb. 15, 1944 |

FOREIGN PATENTS

| Number | Country | Date |
|---|---|---|
| 9,683 | Great Britain | 1901 |